(12) United States Patent
Moussaffi

(10) Patent No.: US 10,621,475 B2
(45) Date of Patent: Apr. 14, 2020

(54) SUPPORT VECTOR MACHINE PREDICTION METHOD

(71) Applicant: Shutterfly, Inc., Redwood City, CA (US)

(72) Inventor: Omer Moshe Moussaffi, Haifa (IL)

(73) Assignee: Shutterfly, LLC, Redwood City, CA (US)

( * ) Notice: Subject to any disclaimer, the term of this patent is extended or adjusted under 35 U.S.C. 154(b) by 0 days.

(21) Appl. No.: 16/216,010

(22) Filed: Dec. 11, 2018

(65) Prior Publication Data

US 2020/0026964 A1    Jan. 23, 2020

Related U.S. Application Data

(63) Continuation-in-part of application No. 16/037,223, filed on Jul. 17, 2018.

(51) Int. Cl.
*G06N 20/00* (2019.01)
*G06F 17/16* (2006.01)
*G06K 9/62* (2006.01)
*G06K 9/00* (2006.01)
*G06T 11/60* (2006.01)

(52) U.S. Cl.
CPC ....... *G06K 9/6262* (2013.01); *G06K 9/00288* (2013.01); *G06K 9/6269* (2013.01); *G06F 17/16* (2013.01); *G06K 9/00624* (2013.01); *G06N 20/00* (2019.01); *G06T 11/60* (2013.01)

(58) Field of Classification Search
CPC ...... G06N 20/00; G06F 17/16; G06K 9/6262; G06K 9/6269; G06K 9/00288; G06K 9/00624; G06T 11/60
See application file for complete search history.

(56) References Cited

U.S. PATENT DOCUMENTS

2008/0133434 A1* 6/2008 Asar ............... G06N 20/00
706/12

* cited by examiner

*Primary Examiner* — Kenny A Cese
(74) *Attorney, Agent, or Firm* — Xin Wen

(57) ABSTRACT

A computer-implemented method is disclosed for image recognition and other applications. The method employs an SVM model and can reduce false negatives and increase recognition accuracies by raising the sample-to-support-vector ratio.

19 Claims, 3 Drawing Sheets

SUPPORT VECTOR MACHINE PREDICTION METHOD

TECHNICAL FIELD

This application relates to improved image recognition methods for automated imaging and other applications.

BACKGROUND OF THE INVENTION

The wide adoption of smart phones and digital cameras has caused an explosion in the number of digital images. Digital images can be viewed, shared over the Internet, and posted on mobile applications and social networks using computer devices. Images can also be incorporated into photo products such as photographic prints, greeting cards, photo books, photo calendars, photo mug, photo T-shirt, and so on. In electronic forms or on physical products, images are often mixed with text and other design elements, and laid out in a particular fashion to tell a story.

Digital images often contain significant objects and people's faces. Creating photo blogs or high-quality image products, such as photobooks and greeting cards, naturally requires proper consideration of those objects and people's faces. For example, important people such as family members should have their faces prominently shown in image products while strangers' faces should be minimized. In another example, while pictures of different faces at a same scene can be included in an image-based product, the pictures of a same person at a same scene should normally be trimmed to allow only the best one(s) to be presented. Examples of significant objects include people's clothing, daily objects such as furniture, a birthday cake, and a soccer ball, and natural or man-made landmarks.

Faces need to be detected and group based on persons' identities before they can be properly selected and placed in image products. Most conventional face detection techniques concentrate on face recognition, assuming that a region of an image containing a single face has already been detected and extracted and will be provided as an input. Common face detection methods include knowledge-based methods; feature-invariant approaches, such as the identification of facial features, texture and skin color; template matching methods, both fixed and deformable; and appearance based methods. After faces are detected, face images of each individual can be categorized into a group regardless whether the identity of the individual is known or not. For example, if two individuals Person A and Person B are detected in ten images. Each of the images can be categorized or tagged one of the four types: A only; B only, A and B; or neither A nor B. Algorithmically, the tagging of face images require training based one face images of known persons (or face models), for example, the face images of family members or friends of a user who uploaded the images.

To save users' time, technologies have been developed to automate the creation of photo-product designs. These automatic methods are facing increased challenges as people take more digital photos. A single average vacation trip nowadays can easily produce thousands of photos. Automatic sorting, analyzing, grouping, and laying out such a great number of photos in the correct and meaningful manner are an immense task.

There is therefore a need for more accurately recognizing and grouping face images and other objects and incorporating them into photo-product designs and other imaging applications.

SUMMARY OF THE INVENTION

Various machine learning methods have been used to recognize and categorize faces or objects in images. One commonly used method is support vector machine (SVM). A common problem in SVM and other machine learning methods is that their recognition accuracies are low when the sample set is small. The cause for this problem is that there are typically a large number of support vectors; a small sample set leads to data over-fitting. Such sample bias results in recognition errors in the form of false positives and false negatives.

The present application discloses novel methods that increase the ratio of sample number to support vector number in an SVM model, which can reduce false negatives and increase recognition accuracies.

In a general aspect, the present invention relates to a computer-implemented method that includes selecting a kernel and kernel parameters for a first Support Vector Machine (SVM) model comprising SVM support vector number of support vectors, and testing the first SVM model on a feature matrix T to produce false positive (FP) data set and false negative (FN) data set by a computer system, wherein the feature matrix T includes n feature vectors of length m, wherein n and m are integer numbers. The method includes copying the feature matrix T to produce a feature matrix T_best comprising T_best sample number of sample points, checking if a ratio (T_best sample number)/(SVM support vector number) is above a threshold for the first SVM model on T_best, and if the ratio is above the threshold, performing SVM predictions using the first SVM model on the feature matrix T_best.

Implementations of the system may include one or more of the following. The n feature vectors can be based on faces or objects in sample images, wherein the first SVM model can be used on the feature matrix T_best to classify the faces or the objects in sample images. The computer-implemented method can further include creating an image-product design based on the faces or the objects in the images classified by the first SVM model using the feature matrix T_best. If the ratio (T_best sample number)/(SVM support vector number) is not above the threshold for the first SVM model on T_best, repeating the steps of selecting, testing, automatically removing, retraining, and checking to find a second SVM model having (T_best sample number)/(SVM support vector number) ratio that exceeds the threshold. The computer-implemented method can further include performing SVM predictions using the second SVM model on the feature matrix T_best. The computer-implemented method can further include: if a SVM model having (T_best sample number)/(SVM support vector number) ratio that exceeds the threshold is not found, selecting a third SVM model that yields a highest (T_best sample number)/(SVM support vector number) ratio in the step of repeating the steps of selecting, testing, automatically removing, retraining, and checking; and performing SVM predictions using the third SVM model on the feature matrix T_best. The threshold for the (T_best sample number)/(SVM support vector number) ratio can be ten or higher. The computer-implemented method can further include applying Grid Search on the feature matrix T to find optimal kernel parameters before the step of testing the first SVM model on a feature matrix T. The feature vectors can be based on faces or objects in images; the computer-implemented method can further include classifying the objects and the faces in the images by performing SVM predictions on the feature matrix T_best. The computer-implemented method can further include automatically creating designs for photo products based on the objects and faces classified by performing SVM predictions on the feature matrix T_best.

The computer-implemented method can further include selecting a feature vector v from the FP data set to remove from the feature matrix T_best to produce a feature matrix T_v, retraining the first SVM model on the feature matrix T_v to produce a fourth SVM model, calculating a benefit function to produce a benefit function value, wherein the benefit function is dependent of differences between false positives, false negatives, and numbers of support vectors generated respectively on T_best by the first SVM model and on T_v by the fourth SVM model, removing the feature vector v from the feature matrix T_best to obtain an updated feature matrix T_best if the benefit function value meets a predetermined criterion; and performing SVM prediction using the fourth SVM model on the updated feature matrix T_best. The benefit function can be dependent more strongly on the difference between the false negatives than on the difference between the false positives. The difference between false negatives can have a first weighting coefficient in the benefit function, wherein the difference between false positives can have a second weighting coefficient in the benefit function, wherein the first weighting coefficient can be larger absolute value than the second weighting coefficient. The n feature vectors can be based on faces or objects in sample images, wherein the fourth SVM model can be used on the feature matrix T_best to classify the faces or the objects in sample images. The computer-implemented method can further include creating an image-product design based on the faces or the objects in the images classified by the fourth SVM model using the feature matrix T_best. The computer-implemented method can further include repeating the steps of selecting a feature vector v, training the first SVM model, performing SVM predictions, calculating a benefit function, and removing the feature vector v from T_best by selecting and removing a different feature vector corresponding to the FP data set from the feature matrix T_best, wherein SVM predictions are performed using the feature matrix T_best that gives a highest best function value. All the feature vectors corresponding to the FP data set can be evaluated by calculating a corresponding benefic function, where are respectively determined to be removed from the T_best or not depending on a value of the corresponding benefic function. The feature vector v is not removed from the feature matrix T_best if the value of the benefit function does not meet the predetermined criterion. The feature vectors can be based on faces or objects in images, the computer-implemented method can further include classifying the objects and the faces in the images by performing SVM predictions on the feature matrix T_best.

These and other aspects, their implementations and other features are described in detail in the drawings, the description and the claims.

DETAILED DESCRIPTION OF THE INVENTION

Figure 1:
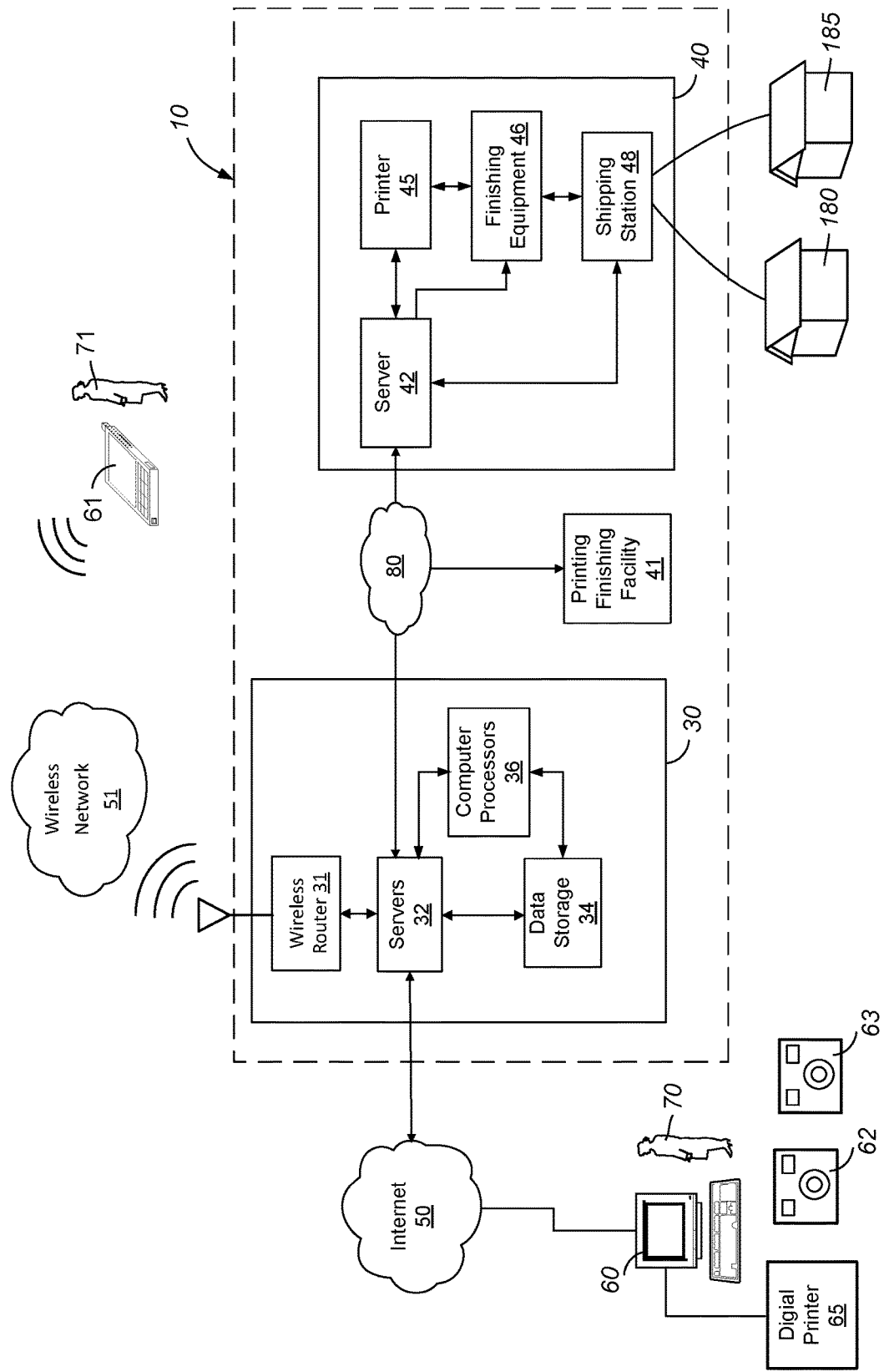
FIG. 1 is a block diagram of a network-based system for producing personalized image products and photo blogs and shares compatible with the present invention.

Referring to FIG. 1, a network-based imaging service system 10 operated by an image service provider such as Shutterfly, Inc. enables users 70, 71 to store, organize, and share images via a wired network or a wireless network 51. The network-based imaging service system 10 also allows users 70, 71 to design image products.

The network-based imaging service system 10 includes a data center 30, one or more product fulfillment centers 40, 41, and a computer network 80 that facilitates the communications between the data center 30 and the product fulfillment centers 40, 41. The data center 30 includes one or more servers 32 for communicating with the users 70, 71, a data storage 34 for storing user data, image and design data, and product information, and computer processor(s) 36 for rendering images and product designs, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51. The servers 32 can also support a mobile application to be downloaded onto wireless devices 61.

The network-based imaging service system 10 can provide products that require user participations in designs and personalization. Examples of these products include the personalized image products that incorporate photos provided by the users, the image service provider, or other sources. In the present disclosure, the term "personalized" refers to information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photobooks, personalized greeting cards, photo stationeries, photo or image prints, photo posters, photo banners, photo playing cards, photo T-shirts, photo mugs, photo aprons, photo magnets, photo mouse pads, a photo phone case, a case for a tablet computer, photo key-chains, photo collectors, photo coasters, photo banners, or other types of photo gift or novelty item. The term photobook generally refers to as bound multi-page product that includes at least one image on a book page. Photobooks can include image albums, scrapbooks, bound photo calendars, or photo snap books, etc. An image product can include a single page or multiple pages. Each page can include one or more images, text, and design elements. Some of the images may be laid out in an image collage.

The user 70 or his/her family may own multiple cameras 62, 63. The user 70 transfers images from cameras 62, 63 to the computer device 60. The user 70 can edit, organize the images on the computer device 60, which can include a personal computer, a laptop, tablet computer, a mobile phone, etc. The cameras 62, 63 include a digital camera, a camera phone, a video camera, as well as image capture devices integrated in or connected with in a computer device, such as the built-in cameras in laptop computers or computer monitors. The user 70 can also print pictures using a printer 65 and make image products based on the images from the cameras 62, 63.

Images can be uploaded from the computer device 60 and the wireless device 61 to the server 32 to allow the user 70 to organize and render images at the website, share the images with others, and design or order image product using the images from the cameras 62, 63. If users 70, 71 are members of a family or associated in a group (e.g. a soccer team), the images from the cameras 62, 63 and the mobile device 61 can be grouped together to be incorporated into an image product such as a photobook, or used in a blog page for an event such as a soccer game.

Products can be ordered by the users 70, 71 based on the image product designs. The physical products can be manufactured by the printing and finishing facilities 40 and 41 and received by recipients at locations 180, 185. The recipients can also receive digital versions of the image-product designs over the Internet 50 and/or a wireless network 51. For example, the recipient can receive, on her mobile phone, an electronic version of a greeting card signed by handwritten signatures from her family members.

For the fulfillments of personalized image products, the product fulfillment center 40 can include one or more printers 45 for printing images, finishing equipment 46 for operations such as cutting, folding, binding the printed image sheets, and shipping stations 48 for verifying the orders and shipping the orders to recipients 180 and 185. Examples of the printers 45 include can be digital photographic printers, offset digital printers, digital printing presses, and inkjet printers. The finishing equipment 46 can perform operations for finishing a complete image-based product other than printing, for example, cutting, folding, adding a cover to photo book, punching, stapling, gluing, binding, and envelope printing and sealing. The shipping stations 48 may perform tasks such as packaging, labeling, package weighing, and postage metering.

The creation of personalized image products can take considerable amount of time and effort. To save users' time, technologies have been developed by Shutterfly, Inc. to automate the creation of photo-product designs. Given the thousands of photos that people now often take just from one occasion, automatic sorting, analyzing, grouping, curating, and laying out a large number of photos have become increasingly challenging. Accurately recognizing faces and objects in photos are essential to the technologies for automated photo-product designs. To this end, an improved machine learning method based on SVM is described below, which has helped the recognition accuracies in classifying and recognizing objects or faces, especially when only a small number of sample objects or faces are available in those images.

A common problem in SVM and other machine learning methods is that recognition accuracy is low when the sample set is small. The cause for this problem is that there are typically a large number of support vectors; a small sample set can lead to data overfitting, resulting false positives and false negatives. Precision and Recall are two metrics for measuring classifier output quality. Higher Precision can be achieved by reducing false positives, while higher Recall is obtained by reducing false negatives.

In the presently disclosed methods, the over fitting problem is reduced and recognition accuracy improved by tackling one of, rather than, both higher Precision and higher Recall goals. Since False Negatives are an important source for recognition inaccuracies, the disclosed novel SVM methods have been developed by focusing on achieving higher Recall in classifying face and other objects.

A SVM model includes a kernel function, kernel parameters used for transforming predicted data, and a set of support vectors which are used to separate the transformed data into True and False predictions.

Figure 2:
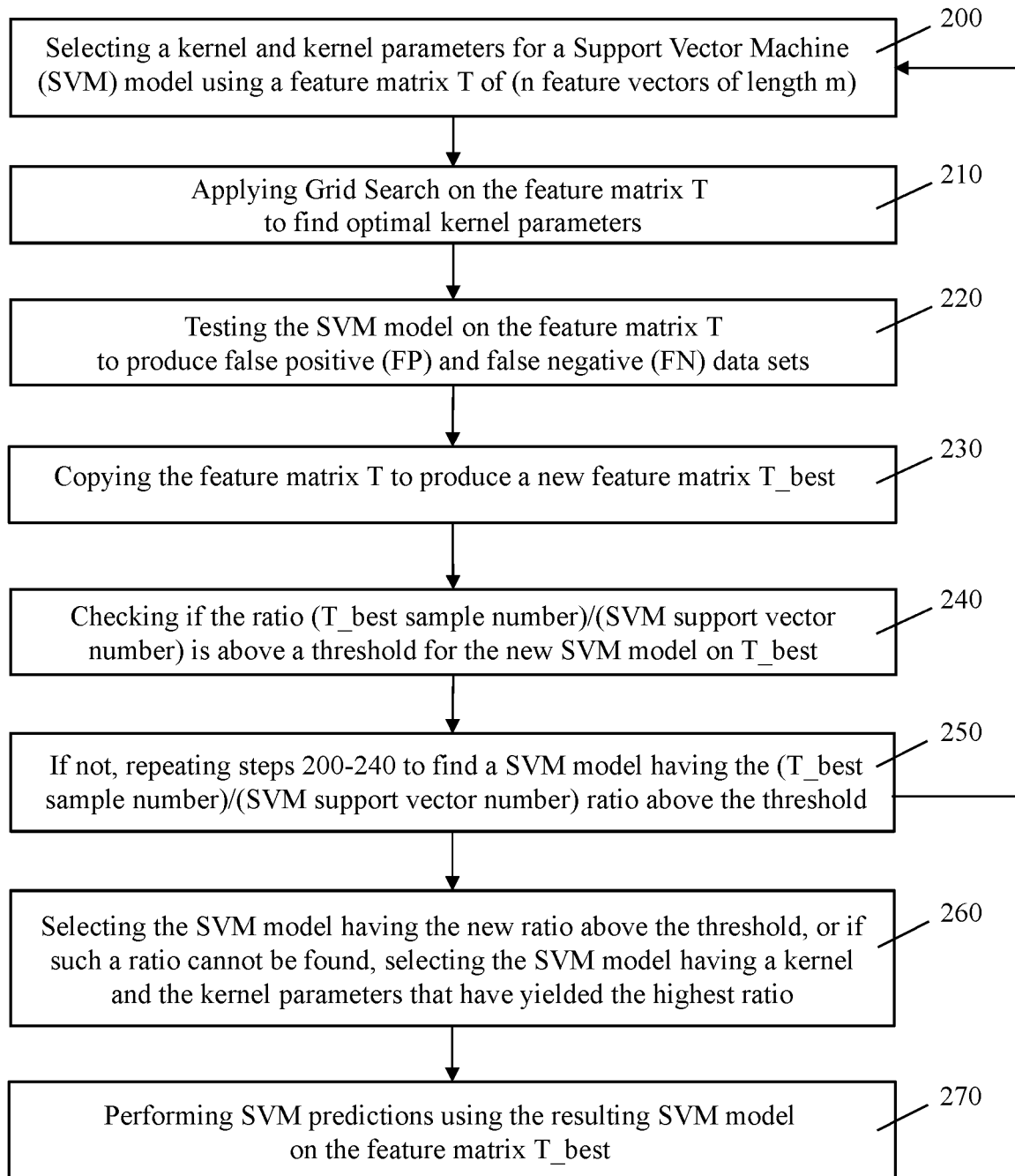
FIG. 2 is a flow diagram illustrating a high-recall SVM method with increased recognition accuracy in accordance with the present invention.

In some embodiments, FIG. 2 shows a first sub-flow of the disclosed methods, in which the kernel and kernel parameters are optimized in the SVM model to increase the ratio of sample number to support vector number to above a threshold in a feature matrix.

Referring to FIGS. 1 and 2, a computer processor selects kernel parameters for Support Vector Machine (SVM) using a feature matrix T comprising n feature vectors each having a length m (step 200). In pattern recognition and machine learning, a feature vector is an n-dimensional vector of numerical features that represent some objects (e.g. a face image or other objects as described above). Representing human faces or objects by numerical feature vectors can facilitate processing and statistical analysis of the human faces or the objects. The vector space associated with these feature vectors is often called the feature space.

A feature matrix comprising all feature vectors represents the entire data set used for testing, training, and validation of SVM models. The entire data set is divided into test set, and train set. At every point on the grid for grid search, a cross validation set is randomly sampled from the train set. The SVM model is trained on train set or the cross validation set. Precision and Recall are evaluated by comparing SVM prediction on the cross validation set with the Ground Truth labels on that set. The SVM model with the best precision or best recall is being chosen from the grid search.

The selection of kernel parameters for SVM is conducted on a test data set. Kernel methods require only a user-specified kernel, i.e., a similarity function over pairs of data points in raw representation. Kernel methods employ kernel functions to operate in a high-dimensional, implicit feature space without ever computing the coordinates of the data in that space, but rather by simply computing the inner products between the images of all pairs of data in the feature space. This operation is often computationally cheaper than the explicit computation of the coordinates. The computer processor can be implemented by the computer processor 36, the computer device 60, or the mobile device 61.

In the disclosed high-recall SVM method, the computer processor applies Grid Search on the feature matrix T to find optimal kernel parameters (step 210). A set of pre-prepared "Ground Truth" labels for all feature vectors. The computer processor compares the Ground-Truth labels to the SVM prediction vector to find TP, TN, FP, FN data sets. The SVM model based on the kernel and the optimized kernel parameters is then tested on the entire data set, the feature matrix T, to produce false positive (FP) and false negative (FN) data sets (step 220).

The feature matrix T is then copied to T_best (step 230), and the new SVM model is evaluated on T_best. The computer processor checks if the ratio (T_best sample number)/(SVM support vector number) is above a threshold for the new SVM model on T_best by the computer processor (step 240). For example, the threshold for the ratio can be set at 10 or higher, meaning that it is desirable for the sample number to be at least ten times of the support vector number in the SVM model to avoid the over-fitting problem.

If the ratio is not above the threshold, steps 200-240 are repeated to find a SVM model (with new kernel parameters and sometimes a new kernel) having a (T_best sample number)/(SVM support vector number) ratio that exceeds the threshold (step 250). This iteration may involve trying and selecting different kernel parameters, and/or using a larger data set.

If such a SVM model having the new ratio above the threshold can be found in step 250, that SVM model is selected (step 260). Otherwise, if such a ratio cannot be found, the computer processor selects the SVM model having kernel and the kernel parameters that has yielded the highest ratio in step 250 (step 260).

The computer processor can then perform SVM predictions using the resulting SVM model on the entire data set of the feature matrix T_best (step 270). The resulting SVM can be the SVM found in steps 240 and 250 that has the ratio exceeding the threshold, or the SVM model that has yielded the highest ratio in step 260. In some embodiments, the feature vectors are based on faces or objects in sample images. The objects and the faces in the sample images are more accurately classified by SVM predictions using the resulting SVM model on T_best.

Figure 3:
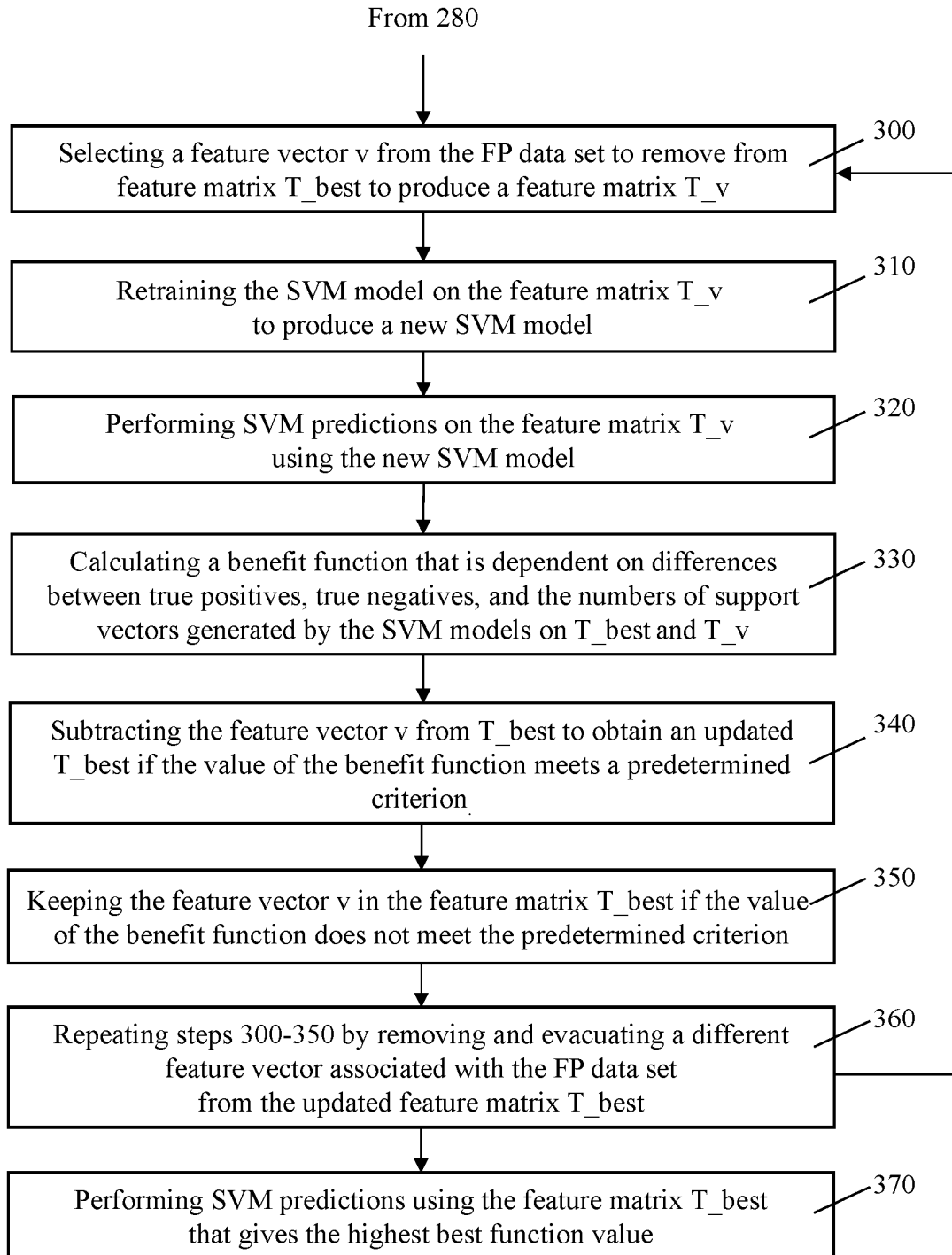
FIG. 3 is a flow diagram illustrating a subtractive high-recall SVM method for reducing false negatives and increasing recognition accuracy in accordance with the present invention.

In some embodiments, FIG. 3 shows a second sub-flow of the disclosed methods, in which the support vector set is further optimized in the SVM model obtained in the first sub-flow shown in FIG. 2. Specifically, the first sub-flow of the disclosed high-recall SVM method can be improved further in accuracies by optimizing the placements of the feature vectors corresponding to the FP data set in vs. out of the feature matrix T_best. The accuracies of the SVM model is improved, while the complexity of the SVM model (number of support vectors) is reduced.

Referring to FIGS. 1-3, a feature vector v from the FP data set is selected and removed from the feature matrix T_best to produce a feature matrix T_v (step 300). The feature matrix T_v is a temporary feature matrix for evaluating the feature vector v.

The SVM model based on the kernel and the optimized kernel parameters adopted in step 260 is retrained on the feature matrix T_v to produce a new SVM model (step 310). The computer processor then performs SVM predictions using the new SVM model on the feature matrix T_v (step 320).

A benefit function value is then calculated (step 330) to evaluate the removal of the feature vector v. The benefit function is dependent on the differences between true positives, true negatives, and the number of support vectors generated respectively by the latest SVM model on T_best and by the new SVM model on T_v (step 330).

For instance, an example of such benefit function is as follows:

$$C(v) = [\text{size}(FP\_best) - \text{size}(FP\_v)] * \text{alpha} + [\text{size}(FN\_best) - \text{size}(FN\_v)] * \text{beta} + [nSV\_best - nSV\_v] * \text{gamma},$$

where alpha, beta and gamma are positive global parameters (i.e. weighting coefficients), used to control the ratio of sample number to support vector number. Decreases in False sets (Positive or Negative) and a decrease in model complexity (nSV, the number of support vectors) from T_best to T_v are beneficial, and will result in an increased value of the benefit function C(v). In other words, a higher positive C(v) value indicates that it is beneficial to remove the feature vector v.

It should be noted that the benefic function C(v) can be equivalently written using TP_best, TP_v, TN_best, and TN_v without affecting the outcome of the present method:

$$C(v) = [-\text{size}(TP\_best) + \text{size}(TP\_v)] * \text{alpha} + [-\text{size}(TN\_best) + \text{size}(TN\_v)] * \text{beta} + [nSV\_best - nSV\_v] * \text{gamma}.$$

In other words, it is beneficial, as indicated by an increase of C(v), for an increase in True sets (Positive or Negative) and a decrease in model complexity (nSV, the number of support vectors) from T_best to T_v.

An example for the set of (alpha, beta, gamma) values are (1, 2, 5). In this example, alpha has an absolute value smaller than beta means that FN is more significant than FP, and an increase in FN (i.e. a decrease in TN) should be penalized more, which is intended for the present high-recall SVM method. A larger gamma represents a bias toward simple SVM model with fewer support vectors and makes sure that support vectors are removed if their removal simplifies the SVM model without significantly hampering performance.

The feature vector v is removed from T_best if the value of the benefit function meets a predetermined criterion (step 340). For example, the threshold value can be zero for the benefit function. If C(v)>0, then the decrease in false sets is worthwhile and the model complexity has not jumped. If so, the new feature vector v is removed from T_best (step 340). The True sets, False sets, and the feature vectors are updated in the feature matrix:

FN_best=FN_v
TN_best=TN_v
FP_best=FP_v
TP_best=TP_v
nSV_best=nSV_v.

The updated T_best is the current best feature vector matrix that has removed with the feature vectors v that has been determined to be beneficial as describe above.

If the benefit function value does not meet the predetermined criterion, the feature vector v is not removed from the feature matrix T_best (step 350). In the example above, if C(v)<=0, the True sets, False sets, and the feature vectors in the feature matrix T_best are not updated.

Then steps 300-350 is repeated by selecting and removing a different feature vector corresponding to the FP data set from the feature matrix T_best (step 360). All the feature vectors corresponding to the FP data set will be removed and evaluated in iteration by repeating steps 300-360.

After all feature vectors corresponding to the FP data set have been evaluated as discussed above, the computer processor performs SVM prediction using the feature matrix T_best that gives the highest best function value (step 370). If no feature vector v has been a removed from T_best, the same version of T_best as in steps 260-270 is still used for performing SVM predictions.

In some embodiments, the feature vectors are based on faces or objects in sample images. The objects and the faces in the sample images are more accurately classified by SVM predictions using the resulting SVM model on T_best.

After the faces and objects in the sample images are classified by the SVM model obtained in step 280 and step 370, the images can be properly selected based on the classified faces and/or the objects and are incorporated in an image-product design. The classification of the faces and the objects, and the selections and incorporation of the photos can be automated in the computer system to save users' time. The curation and layout of the image-product designs can be automatically created by the computer processor 36, the computer device 60, or the mobile device 61, then presented to a user 70 or 71 (FIG. 1), which allows the image product to be ordered and manufactured by the printing and finishing facilities 40 and 41 (FIG. 1). The image product creation can also include partial user input or selections on styles, themes, formats, or sizes of an image product, or text to be incorporated into an image product.

The accurate recognition and grouping of faces and objects disclosed herein can significantly reduce time to create the product designs, and improve the relevance and appeal of an image product. For example, the most important people can be determined and to be emphasized in an image product. Redundant person's face images can be filtered out and selected before incorporated into an image product. Irrelevant persons can be minimized or avoided in the image product.

The disclosed methods can include one or more of the following advantages. The disclosed methods can drastically increase the accuracies in classifying objects and faces in images, especially in small sample set. The disclosed methods can be implemented automatically, and can produce image-based product designs with higher quality, better appeal, and more relevance to users.

It should be noted that the presently disclosed methods are not limited to imaging applications and image-product designs. Examples of other suitable applications include information classification and prediction, text recognition and classification, voice recognition, biometrics recognition, classification of gene expression data and other biomedical data, etc.

What is claimed is:

1. A computer-implemented method, comprising:
    selecting a kernel and kernel parameters for a first Support Vector Machine (SVM) model comprising SVM support vector number of support vectors;
    testing the first SVM model on a feature matrix T to produce false positive (FP) data set and false negative (FN) data set by a computer system, wherein the feature matrix T includes n feature vectors of length m, wherein n and m are integer numbers;
    copying the feature matrix T to produce a feature matrix T_best comprising T_best sample number of sample points;
    checking, by the computer system, if a ratio (T_best sample number)/(SVM support vector number) is above a threshold for the first SVM model on T_best; and
    if the ratio is above the threshold, performing SVM predictions using the first SVM model on the feature matrix T_best.

2. The computer-implemented method of claim 1, wherein the n feature vectors are based on faces or objects in images, wherein the first SVM model is used on the feature matrix T_best to classify the faces or the objects in the images.

3. The computer-implemented method of claim 2, further comprising:
    creating an image-product design based on the faces or the objects in the images classified by the first SVM model using the feature matrix T_best.

4. The computer-implemented method of claim 1, further comprising:
    if the ratio (T_best sample number)/(SVM support vector number) is not above the threshold for the first SVM model on T_best, repeating the steps of selecting, testing, automatically removing, retraining, and checking to find a second SVM model having (T_best sample number)/(SVM support vector number) ratio that exceeds the threshold.

5. The computer-implemented method of claim 4, further comprising:
    performing SVM predictions using the second SVM model on the feature matrix T_best.

6. The computer-implemented method of claim 4, further comprising:
    if a SVM model having (T_best sample number)/(SVM support vector number) ratio that exceeds the threshold is not found, selecting a third SVM model that yields a highest (T_best sample number)/(SVM support vector number) ratio in the step of repeating the steps of selecting, testing, automatically removing, retraining, and checking; and
    performing SVM predictions using the third SVM model on the feature matrix T_best.

7. The computer-implemented method of claim 1, wherein the threshold for the (T_best sample number)/(SVM support vector number) ratio is ten or higher.

8. The computer-implemented method of claim 1, comprising:
    applying Grid Search on the feature matrix T to find optimal kernel parameters before the step of testing the first SVM model on a feature matrix T.

9. The computer-implemented method of claim 1, wherein the feature vectors are based on faces or objects in images, the computer-implemented method further comprising:
    classifying the objects and the faces in the images by performing SVM predictions on the feature matrix T_best.

10. The computer-implemented method of claim 9, further comprising:
    automatically creating designs for photo products based on the objects and faces classified by performing SVM predictions on the feature matrix T_best.

11. The computer-implemented method of claim 1, further comprising:
    selecting a feature vector v from the FP data set to remove from the feature matrix T_best to produce a feature matrix T_v;
    retraining the first SVM model on the feature matrix T_v to produce a fourth SVM model;
    calculating a benefit function to produce a benefit function value, wherein the benefit function is dependent of differences between false positives, false negatives, and numbers of support vectors generated respectively on T_best by the first SVM model and on T_v by the fourth SVM model;
    removing the feature vector v from the feature matrix T_best to obtain an updated feature matrix T_best if the benefit function value meets a predetermined criterion; and
    performing SVM prediction using the fourth SVM model on the updated feature matrix T_best.

12. The computer-implemented method of claim 11, wherein the benefit function is dependent more strongly on the difference between the false negatives than on the difference between the false positives.

13. The computer-implemented method of claim 12, wherein the difference between false negatives has a first weighting coefficient in the benefit function, wherein the difference between false positives has a second weighting coefficient in the benefit function, wherein the first weighting coefficient is larger absolute value than the second weighting coefficient.

14. The computer-implemented method of claim 11, wherein the n feature vectors are based on faces or objects in images, wherein the fourth SVM model is used on the feature matrix T_best to classify the faces or the objects in the images.

15. The computer-implemented method of claim 14, further comprising:
   creating an image-product design based on the faces or the objects in the images classified by the fourth SVM model using the feature matrix T_best.

16. The computer-implemented method of claim 11, further comprising:
   repeating the steps of selecting a feature vector v, training the first SVM model, performing SVM predictions, calculating a benefit function, and removing the feature vector v from T_best by selecting and removing a different feature vector corresponding to the FP data set from feature matrix T_best,
   wherein SVM predictions are performed using the feature matrix T_best that gives a highest best function value.

17. The computer-implemented method of claim 16, wherein all the feature vectors corresponding to the FP data set are evaluated by calculating a corresponding benefic function and determined to be removed from the T_best or not depending on a value of the corresponding benefic function.

18. The computer-implemented method of claim 11, wherein the feature vector v is not removed from the feature matrix T_best if the value of the benefit function does not meet the predetermined criterion.

19. The computer-implemented method of claim 11, wherein the feature vectors are based on faces or objects in images, the computer-implemented method further comprising:
   classifying the objects and the faces in the images by performing SVM predictions on the feature matrix T_best.

* * * * *